US011972355B2

(12) United States Patent
Koduru (10) Patent No.: US 11,972,355 B2
(45) Date of Patent: Apr. 30, 2024

(54) METHOD AND SYSTEM FOR GENERATING BEST PERFORMING DATA MODELS FOR DATASETS IN A COMPUTING ENVIRONMENT

(71) Applicant: iQGateway LLC, The Woodlands, TX (US)

(72) Inventor: Praveen Koduru, The Woodlands, TX (US)

(73) Assignee: iQGateway LLC, The Woodlands, TX (US)

(*) Notice: Subject to any disclaimer, the term of this patent is extended or adjusted under 35 U.S.C. 154(b) by 596 days.

(21) Appl. No.: 17/328,234

(22) Filed: May 24, 2021

(65) Prior Publication Data
US 2021/0279643 A1    Sep. 9, 2021

Related U.S. Application Data

(63) Continuation-in-part of application No. 15/652,281, filed on Jul. 18, 2017, now abandoned.

(51) Int. Cl.
*G06F 11/34* (2006.01)
*G06F 11/32* (2006.01)
*G06F 18/214* (2023.01)
*G06N 3/126* (2023.01)
*G06N 20/00* (2019.01)

(52) U.S. Cl.
CPC ........... *G06N 3/126* (2013.01); *G06F 11/328* (2013.01); *G06F 11/3447* (2013.01); *G06F 18/2148* (2023.01); *G06N 20/00* (2019.01)

(58) Field of Classification Search
CPC .... G06N 3/126; G06N 20/00; G06F 18/2148; G06F 11/328; G06F 11/3447
See application file for complete search history.

(56) References Cited

U.S. PATENT DOCUMENTS

| | | | |
|---|---|---|---|
| 6,941,287 B1* | 9/2005 | Vaidyanathan | G06N 3/126 706/14 |
| 2006/0161403 A1* | 7/2006 | Jiang | G06N 20/00 703/2 |
| 2016/0232457 A1* | 8/2016 | Gray | G06F 16/26 |

* cited by examiner

*Primary Examiner* — Chuen-Meei Gan
(74) *Attorney, Agent, or Firm* — Jason C. Cameron (57) ABSTRACT

A method and system for generating best performing data models for datasets is disclosed. The method includes obtaining input dataset from external data sources. The method includes dividing dataset into three parts based on type of data variables and data samples. The method includes retrieving data modelling methods from a database and generating first set of data models for the first part of the dataset. The method includes determining first fitness function for the first part of the dataset based on the first set of data model. The method includes generating second set of data models for the second part of the dataset and determining second fitness function based on the second set of data model. Further, the method includes determining best performing data model among the first set of data models and the second set of data model. Additionally, the method includes outputting the best performing data model.

18 Claims, 6 Drawing Sheets

METHOD AND SYSTEM FOR GENERATING BEST PERFORMING DATA MODELS FOR DATASETS IN A COMPUTING ENVIRONMENT

CROSS-REFERENCE TO RELATED APPLICATIONS

This application claims priority from a non-provisional patent application filed in the US having patent application Ser. No. 15/652,281 filed on Jul. 18, 2017 and titled "METHOD AND SYSTEM FOR AUTOMATED MODEL BUILDING".

FIELD OF INVENTION

Embodiments of the present disclosure relate to model building systems and methods, and more particularly to methods and systems for generating best performing data models for datasets in a computing environment.

BACKGROUND

Conventional model building techniques involve training data to generate a model based on patterns learnt from the training data. This is achieved by using a cost function that is designed to minimize error in predictions. The model is then validated using testing data to measure accuracy of the model's performance on data not utilized during training process. This ensures that the model is generalized enough and is not over-fitted on the training data.

As a part of standard model building process, the following steps are typically followed:
1. Defining problem to be solved;
2. Preparation of necessary data;
3. Identifying parameters required for performance measurement;
4. Defining fitness functions and expected baseline performance;
5. Identifying different modelling methods and their variants, where variants are determined based on changes in input data; and
6. Running models on testing datasets and selecting a best performing data model among the selected models as a feasible solution.

One of the major challenges in this process is the sheer volume of permutations and combinations available from a decision-making point of view. Some of the factors that influence the output include, but are not limited to, the number of input data fields, different selected modelling methods, various hyper-parameters used to iterate the model performance (such as the number of trees in a decision tree modelling method), performance parameters (such as accuracy, precision, recall and the like), and the like. Based on the abovementioned steps and parameters considered, identifying an optimum solution becomes a very challenging task and hence the scientist or modeler is left with lot of iterative work and data to deal with.

In such cases, identifying the optimum or best performing data model also depends on experience and expertise of the scientist or modeler. With new and faster computational machines and with adoption of parallel or cluster computing for modeling, it is now possible to compute many variants of the models in a distributed fashion in a much shorter time. The current emphasis has been towards using large amounts of data to generate better models, which may or may not provide the best performing model that explains the inherent patterns in the provided data. Additionally, such models based on large data could also be black box or complex systems which inhibit easier interpretation of the patterns generated by the models.

Currently, different modelling methods are used to generate trained models based on the methods utilized and various inherent parameter selections, which are selective to each method. It is a well-known fact that not one method is sufficient to provide a good model in most of the problems. Hence the data scientist or modeler faces the problem to implement multiple modelling methods for every problem, assess the performance and quantify the accuracy of the output, and select the best performing data modelling method. The search becomes even more complicated when the modelling methods are sensitive to the training data quality, distributions, and method parameters, that can affect the final performance.

Furthermore, it is expected that if the generated training model is a closer approximation of the global optima, then performance metrics will be similar in both training and testing data evaluations. However, most conventional learning methods could easily generate over trained models, and hence have a low generalization due to over-learning of the training dataset. Such generated trained models could easily underperform on the testing data. In order to minimize the errors caused due to over-generalization or over-learning on the training dataset, multiple different techniques include, but not limited to, cross validation, bagging, boosting, ensemble learning, early stopping, and the like are used. However, not all modelling methods or algorithms are conducive to implement this kind of strategy.

In view of the foregoing, there is a need to provide methods and systems where a user can select the data for both training and testing, along with selecting a set of usable modelling methods that can be used to build multiple models. Further, there is a need to provide methods and systems that validates the generated models against data not utilized in training, testing of the models, and generation of a better ranking of models based on performance metrics to enable improved best-performing model selection.

The above-mentioned shortcomings, disadvantages, and problems are addressed herein, and which will be understood by reading and studying the following specification.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

Disclosed herein a system for generating best performing data models for datasets in a computing environment. The system includes one or more hardware processors and a memory coupled to the one or more hardware processors. The memory includes a plurality of subsystems in the form of programmable instructions executable by the one or more hardware processors. The plurality of subsystems includes a dataset receiver module configured for obtaining input dataset from one or more external data sources. The input dataset comprises data variables and data samples. Further, the plurality of subsystems includes dataset segmentation module configured for dividing the obtained dataset into at least three parts based on the type of data variables and the data samples. Each part of the dataset includes samples from the input dataset. A first part of the dataset includes training data; a second part of the dataset includes testing data, and the third part of the dataset includes validation data. Further, the plurality of subsystems include a data model method retrieval module configured for retrieving one or more data modeling methods from a pool of data modeling methods stored in a database. The one or more data modeling methods includes one or more parameter ranges. Furthermore, the plurality of subsystem includes a data model generator module configured for generating a first set of data models for the first part of the dataset by using the retrieved one or more data modeling methods. The input to generate the first set of data models is the first part of the dataset. Furthermore, the plurality of subsystem includes a fitness function determination module configured for determining a first fitness function for the first part of the dataset based on the generated first set of data model. Also, the plurality of subsystems includes the data model generator module further configured for generating a second set of data models for the second part of the dataset by validating the first set of data models and the determined first fitness function with the second part of the dataset. Also, the plurality of subsystems includes the fitness function determination module configured for determining a second fitness function associated with the second part of the dataset based on the generated second set of data model. Also, the plurality of subsystem includes a best performing data model determination module configured for determining at least one best performing data model among the first set of data models and the second set of data models by comparing the determined first fitness function with the determined second fitness function. Additionally, the plurality of subsystems include an output module configured for outputting the determined at least one best performing data model on a user interface of a user device.

Embodiments herein also disclose a method for generating best performing data models for datasets in a computing environment. The method includes obtaining input dataset from one or more external data sources. The input dataset includes data variables and data samples. Further, the method includes dividing the obtained dataset into at least three parts based on the type of data variables and the data samples. Each part of the dataset includes samples from the input dataset. A first part of the dataset includes training data, a second part of the dataset includes testing data, and the third part of the dataset includes validation data. Further, the method includes retrieving one or more data modeling methods from a pool of data modeling methods stored in a database. The one or more data modeling methods comprises one or more parameter ranges. Further, the method includes generating a first set of data models for the first part of the dataset by using the retrieved one or more data modeling methods. The input to generate the first set of data models is the first part of the dataset. Further, the method includes determining a first fitness function for the first part of the dataset based on the generated first set of data model. Also, the method includes generating a second set of data models for the second part of the dataset by validating the first set of data models and the determined first fitness function with the second part of the dataset. Also, the method includes determining a second fitness function associated with the second part of the dataset based on the generated second set of data model. Also, the method includes determining at least one best performing data model among the first set of data models and the second set of data models by comparing the determined first fitness function with the determined second fitness function. Furthermore, the method includes outputting the determined at least one best performing data model on a user interface of a user device.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting. In the following specification and the claims, reference will be made to a number of terms, which shall be defined to have the following meanings. The singular forms "a", "an", and "the" include plural references unless the context clearly dictates otherwise. Throughout the specification, the terms "subsystem" and "module" are used interchangeably.

A computer system (standalone, client or server computer system) configured by an application may constitute a "module" that is configured and operated to perform certain operations. In one embodiment, the "module" may be implemented mechanically or electronically, so a subsystem may comprise dedicated circuitry or logic that is permanently configured (within a special-purpose processor) to perform certain operations. In another embodiment, a "module" may also comprise programmable logic or circuitry (as encompassed within a general-purpose processor or other programmable processor) that is temporarily configured by software to perform certain operations.

Accordingly, the term "module" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

Figure 1:
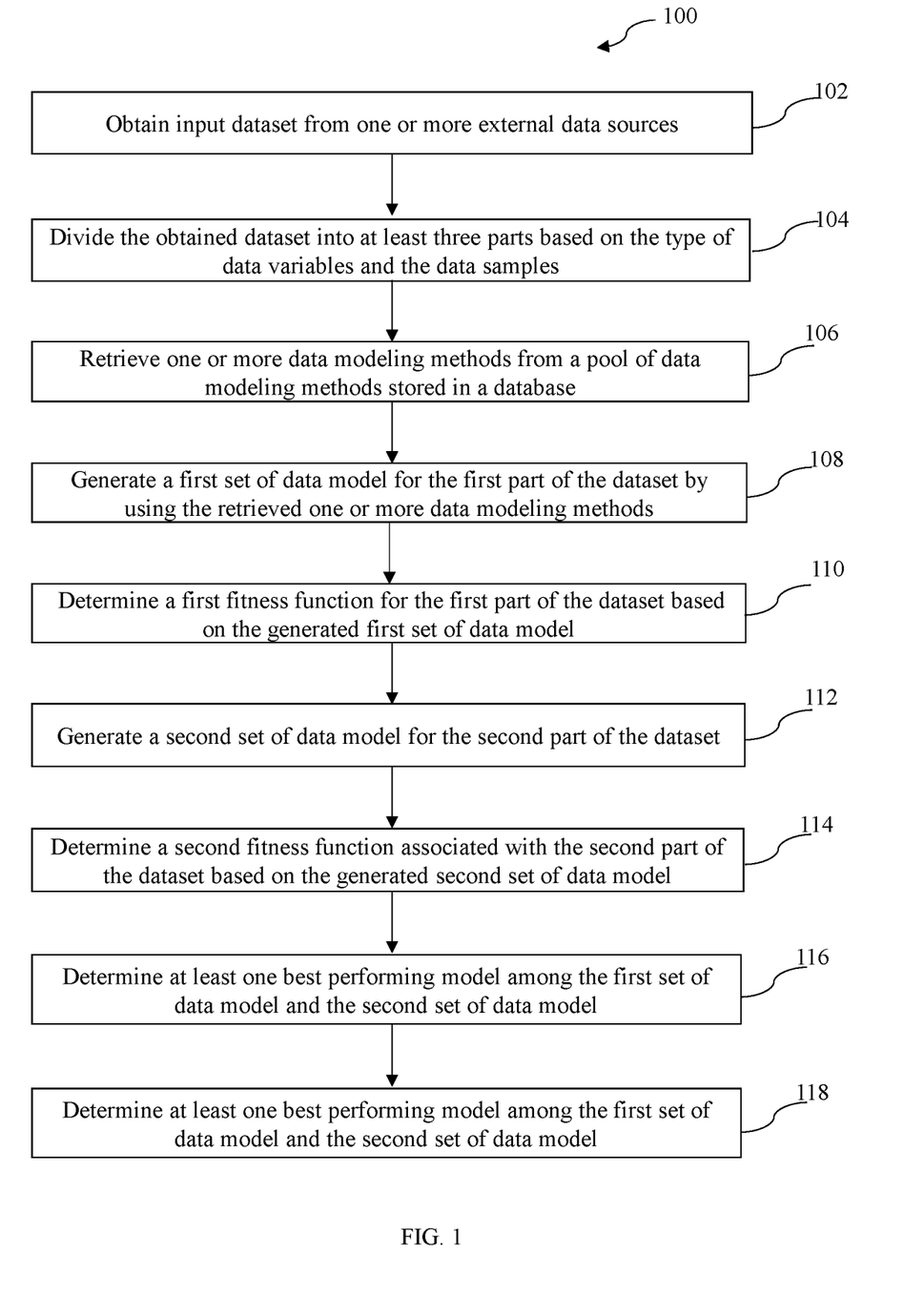
FIG. 1 is a process flowchart illustrating an exemplary method for generating best performing data models for datasets in a computing environment, in accordance with an embodiment of the present disclosure.

FIG. 1 is a process flowchart illustrating an exemplary method 100 for generating best performing data models for datasets in a computing environment, in accordance with an embodiment of the present disclosure. At step 102, input dataset is obtained from one or more external data sources. The input dataset comprises data variables and data samples. The one or more external data sources are connected to a computing system, such as those shown in FIG. 4, FIG. 5 and FIG. 6. The selection of the input dataset is performed to exclude some of the data samples and the data variables to generate different variants for same modelling method. This enables identification of noisy data.

At step 104, the obtained dataset is divided into at least three parts based on type of the data variables and the data samples. Each part of the dataset can comprise samples from the input the dataset. Each of the different parts of the divided datasets can be of equal size (# of rows) for convenience, but not a necessary requirement. Hence they can be of different sizes. Each of the different parts of the divided datasets can be of equal size (# of rows) for convenience, but not a necessary requirement. Hence, they can be of different sizes. A first part of the dataset includes training data, a second part of the dataset includes testing data, and a third part of the dataset includes validation data. The input dataset obtained are divided into three or more parts $(p_1, p_2, p_3, \ldots, p_n)$. The first part of the dataset $(p_1)$ is the training data, the second part of the dataset $(p_2)$ is the testing data, and the third and consecutive parts of the dataset $(p_3, p_4, \ldots, p_n)$ includes the validation data. The division of the dataset is defined based on the user requirement. In another embodiment of the present disclosure, the input dataset is divided uniformly into three or more parts. According to the present disclosure, upon dividing the input dataset, there shall be no similar data points across any of the part of the input dataset.

At step 106, one or more data modelling methods are retrieved from a pool of data modelling methods stored in a database. The modelling algorithm-specific hyper-parameters includes one or more parameter ranges. The one or more parameter ranges comprises number of iterations, tree depth, stopping rounds, learning rate and the like. The one or more data modelling methods are a possible list of modelling algorithms that are available in the software. Examples could include, but are not limited to, Regression, Random Forests, SVM, Neural Network, etc., and comprises one or more machine learning methods and one or more artificial intelligence methods configured for generating data models. Examples of the one or more data modelling methods may be regression, Random Forests, support vector machine, Neural Network, and the like. Any number of different modelling methods are retrieved for the input dataset as long as they are assessed with same fitness function. The fitness function for each part of the input datasets are independent of each other.

At step 108, a first set of data models for the first part of the dataset is generated by using the retrieved one or more data modelling methods. The input to generate the first set of data models is the first part of the dataset. In an embodiment of the present disclosure, each data model is a single data model built using the one or more modelling methods or is a combination of multiple one or more modelling methods such as, mixture of the data models. In an embodiment of the present disclosure, the data models are defined as a combination of, but not limited to, the one or more modelling methods and its relevant parameters. Multiple data models may be built using the same training dataset $(p_1)$, which is the first part of the dataset.

At step 110, a first fitness function for the first part of the dataset is determined based on the generated first set of data model. The first fitness value $(f_1)$ for the first part of the dataset $(p_1)$ is determined by running different modelling methods on the first part of the dataset $(p_1)$ and evaluating their final performance for each of the runs. The fitness function can also include parameters such as number of iterations, tree depth, stopping rounds, learning rate, etc.

At step 112, a second set of data models for the second part of the dataset is generated by validating the first set of data models and the determined first fitness function with the second part of the dataset.

At step 114, a second fitness function associated with the second part of the dataset is determined based on the generated second set of data model. The second fitness function ($f_2$) is generated by revaluating the generated first data model from the different modelling methods on the second part of the dataset ($p_2$) to evaluate the fitness on unseen data during training. Here, the first set of data models are executed on the second part of the dataset ($p_2$), which is the testing data. In an embodiment of the present disclosure, the steps of generating first and second fitness functions for the first part of the dataset and the second part of dataset may be performed iteratively for plurality of data models. This results in N set of data models and N fitness functions. In at least some embodiments, it is possible to use 1 data set with multiple fitness functions. Ex. P1 can have fitness functions (f1) and (f2), and P2 can have (f3) and P3 can have fitness functions (f4) and (f5).

In an alternate embodiment, it is also possible to use one data set with multiple fitness function. For example, $p_1$ can have fitness functions $f_1$ and $f_2$, and $p_2$ can have fitness functions $f_3$ and $p_3$ can have fitness functions $f_4$ and $f_5$.

At step 116, at least one best performing data model among the first set of data models and the second set of data models is determined by comparing the determined first fitness function with the determined second fitness function. The first fitness value ($f_1$) and the second fitness value ($f_2$) are compared with each other. The best performing data model is then determined using a pareto front method. The determined best performing data model(s) is representative of the best generalization and accurate model based on the input data provided. The determined best performing data model(s) is representative of the best generalization and accurate model based on the input data provided. At step 118, the determined at least one best performing data model is outputted on a user interface of a user device.

Further, the method 100 comprises validating the determined at least one best performing data model using the third part of the dataset to generate a final best performing data model and outputting the final best performing data model on the user interface of the user device. The determined at least one best performing data model is further validated on the third or consecutive part of the dataset ($p_3$, $p_4 \ldots , p_n$) to generate final best performing data model and a final fitness function. Earlier, the evaluation is performed on only first and second part of the dataset ($p_1$, $p_2$). Thus, the evaluation is performed on the remaining part of the dataset, which is the validation data, for determining the best performing data model using pareto front. The method 100 can be implemented in any suitable hardware, software, firmware, or combination thereof.

Figure 2:
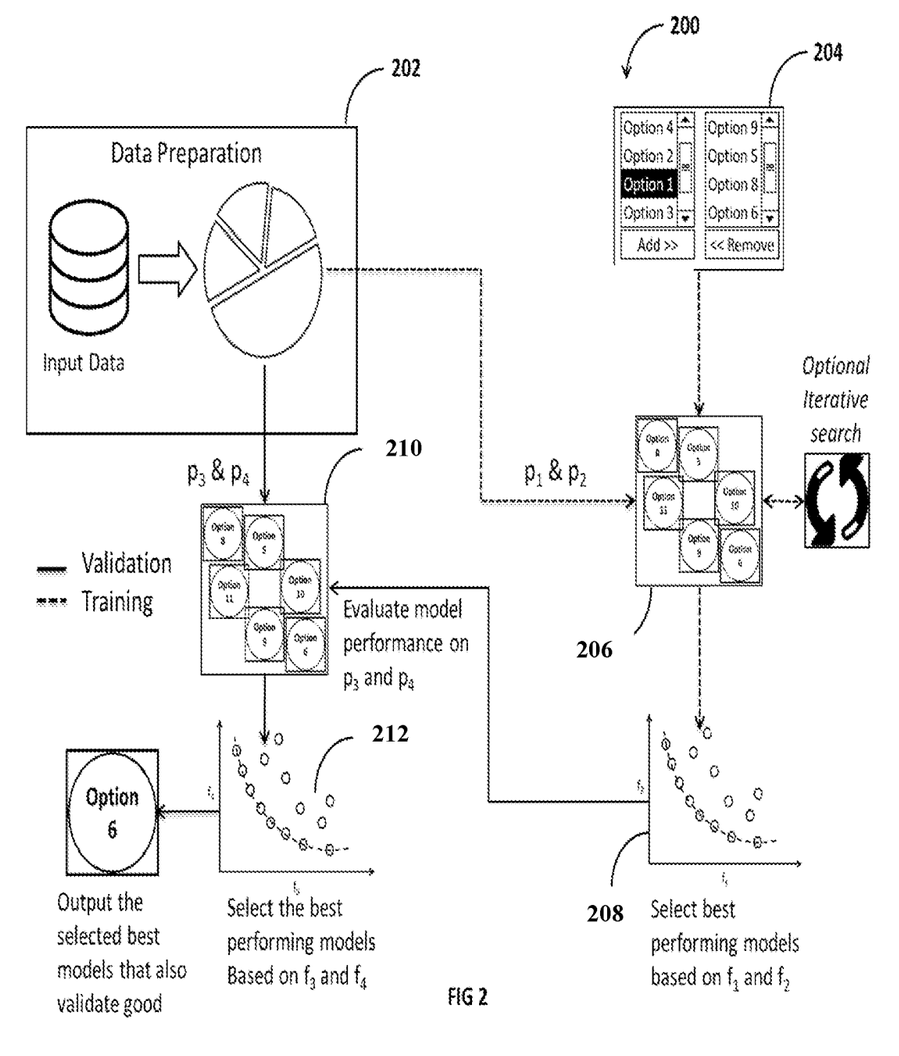
FIG. 2 is a snapshot of a graphical user interface depicting the process of generating best performing data models for datasets, in accordance with an embodiment of the present disclosure.

FIG. 2 is a snapshot of a graphical user interface 200 depicting a process of generating best performing data models for datasets, in accordance with an embodiment of the present disclosure. According to FIG. 2, initially as a first step a data preparation is performed at step 202. The input dataset is obtained from the one or more external data sources and divided into for example, four parts ($p_1$, $p_2$, $p_3$, $p_4$). The number of segments into which the input dataset is divided may be predefined. The four datasets may not comprise of similar data points.

At step 204, the one or more modelling methods are retrieved based on the data model to be built. Thus, a list of modelling methods is obtained that needs to be executed on the first part of the dataset ($p_1$). Each of the one or more modelling methods includes one or more parameters ranges and variants. Assuming the user has selected modelling methods Random Forest and Linear regression, each of these methods have different parameters associated with them. For example, for Random Forest, it would be the number of trees, stopping rounds, stopping metric, etc. and for Regression it is use regularization, perform scaling, etc. For example, suppose if selected modelling methods include random forest and linear regression, each of these methods have different parameters associated with them. For example, for random forest, it would be number of trees, stopping rounds, stopping metric, and the like and for regression it could have use regularization, perform scaling, and the like.

Further, at step 206, the first set of data models for the first part of the dataset and a second set of data models for the second part of the dataset are generated by using the retrieved one or more data modeling methods. In an embodiment, any memetic based iterative search methods such as genetic algorithm, particle swarm optimization, simulated annealing, and the like may be used to generate the first set of data models and the second set of data model. The variants of different data models are generated over multiple iterations as per the memetic iterative search methods to search for better data models. The search is repeated over multiple iterations until a termination condition such as numbers of iterations or convergence conditions are met. The final population that is obtained is passed on to the next step. At step 206, multiple solutions are generated based on the combinations of different options provided by the user or by using the iterative search and hence there are multiple solutions provided. The population refers to these multiple possible models that have been built. In other words, at step 206, multiple solutions are generated based on combinations of different options provided by the user or by using the iterative search and hence there are multiple solutions provided. The population refers to these multiple possible models that are built. Further, the first fitness function for the first set of data models is determined by running the different modelling methods on the first part of the dataset ($p_1$) and their final performance for each of the runs are evaluated. The evaluated first fitness function is stored as ($f_1$). Similarly, the generated first set of data models from the different modelling methods are revaluated on the second part of dataset ($p_2$) to generate the second fitness function. This second fitness function is stored as ($f_2$).

Further, at step 208, both the fitness functions ($f_1$) and ($f_2$) for the first set of data models and the second set of data models are compared using pareto front, which would determine the best performing data models, not only on the training data but also on the unseen data that is the testing data. Based on the conducted comparison on pareto front, the best performing data models are determined. The best performing data models are representative of population of best generalization to the dataset provided.

Further, at step 210, the evaluation of the fitness functions for the best performing data models is repeated using the left-out datasets ($p_3$) and ($p_4$), as both ($p_1$) and ($p_2$) have been used in generating and/or updating the data model. The fitness function of the best performing data models is stored as ($f_3$) and ($f_4$). Further, at step 212, multi-objective optimization is used to determine and rank the best performing data models and output the best performing data models using the fitness functions ($f_3$) and ($f_4$).

Figure 3:
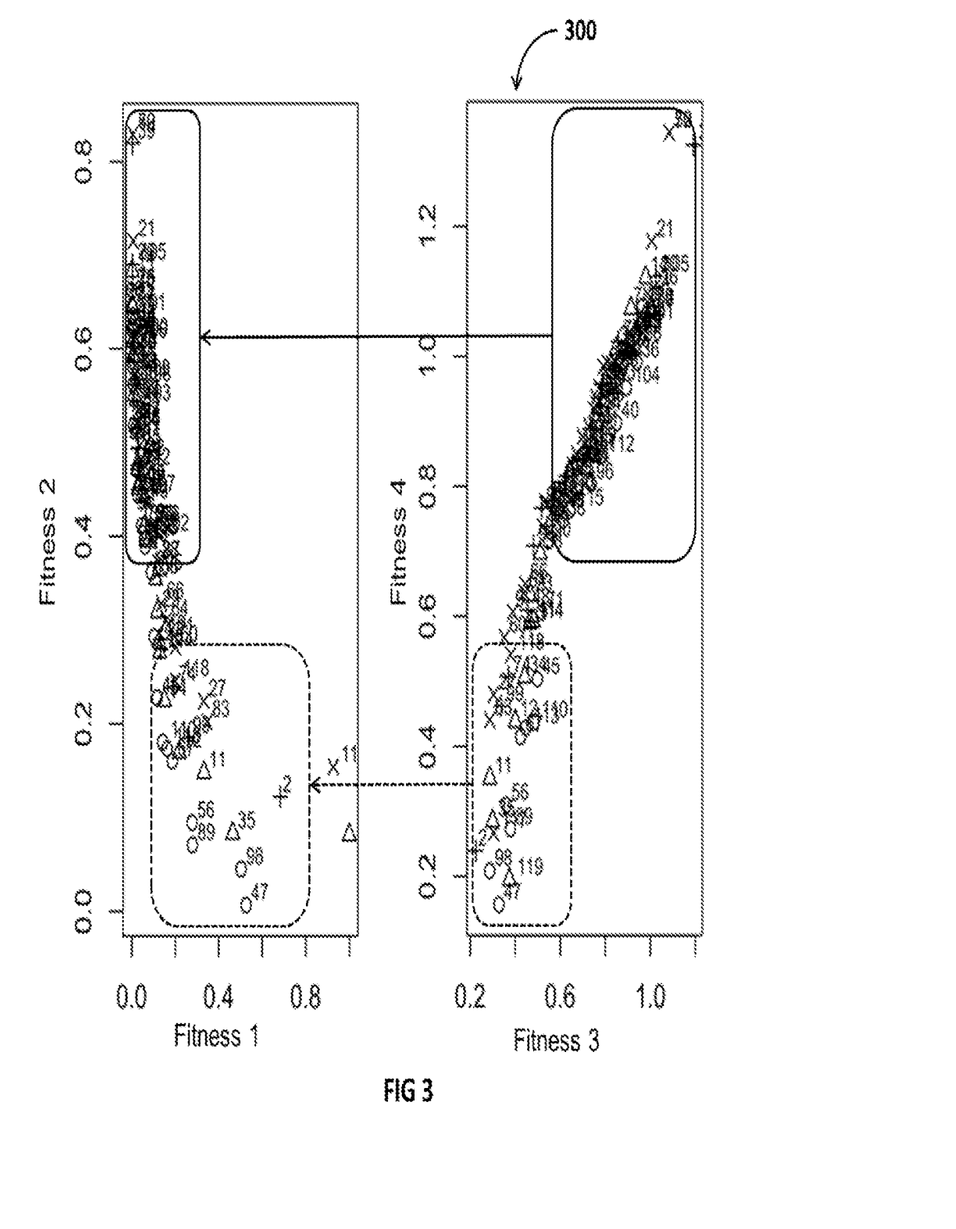
FIG. 3 is a graphical representation of plotting fitness functions of two or more models over pareto front for evaluation, in accordance with an embodiment of the present disclosure.

FIG. 3 is a graphical representation 300 of plotting fitness functions of two or more data models over pareto front for evaluation, in accordance with an embodiment of the present disclosure. The Goldstein price function is used to generate synthetic datasets, which are input datasets. This input dataset is parameterized to have twenty-one coefficients that are the data variables to be estimated. Additionally, the input dataset is also modified to add a noise component to simulate noise in the input datasets. The function is defined as:

$$f(x) = [a_1 + a_{20}(a_2 + a_3x_1 + a_4x_2)^2(a_5 - a_6x_1 + a_7x_1^2 - a_8x_2a_9x_1 + a_{10}x_2^2)]x[a_{11} + a_{21}(a_{12}x_1 - a_{13}x_2)^2(a_{14} - a_{15}x_1 + a_{16}x_1^2 + a_{17}x^2 - a_{18}x_1x_2 + a_{19}x_2^2)] + \delta_{noise}$$

The function f(x) is a known model that is used to test the approach and check some performance issues. There is a noise component to the model. A total of one thousand data samples were selected as input dataset to the modelling method, which is further divided into four parts of equal size. The different test functions were selected as squared error with objective to minimize error. Further, five hundred initial data models were generated based on different initial parameter ranges estimates in range of [0,1].

These initial data models were then passed on to a genetic algorithm for a total of hundred iterations to minimize $f_1$ using $p_1$ over these iterations. At the end of hundredth iteration of the genetic algorithm, the data models obtained are ranked based on $f_1$ and $f_2$. The best performing data models are then revaluated on the $f_3$ and $f_4$ using $p_3$ and $p_4$ respectively. The plots are generated using normalized outputs for the fitness functions for easier interpretation.

If a standard optimization method were used on the input dataset using $p_1$, then the best performing data model have close to 0 fitness functions for $f_1$. However, from the plot, it can be seen that these have a relatively high fitness function values, i.e., inferior performance on all $f_2$, $f_3$ and $f_4$ clearly indicating over fitting on the input dataset. The best performing data model have a slightly higher $f_1$, which also perform equally on the validation datasets on $f_2$, $f_3$ and $f_4$.

Further, from the diagram 300, it is also observed that the over fitted data models that have a low Fitness$_1$ ($f_1$) are clearly having higher errors in Fitness2 ($f_2$) and also in both Fitness3 ($f_3$) and Fitness4 ($f_4$). The best performing data models that performed equally well in Fitness2 ($f_2$), Fitness3 ($f_3$) and Fitness$_4$ ($f_4$) are the ones that have a slightly higher Fitness1 ($f_1$), which would be rejected by standard optimization methods.

Further, from the pareto front plotting, it can be observed that, spread of the data models on $f_1$ axis denotes if the data models could have been over fitted. A wide range of values of $f_1$ range, which can vary from near to 0 to as high as 1.0 This range denotes over fitting on the training data. Further, it can be observed that stronger distribution of data models on the left extreme on $f_1$ and top of $f_2$ denotes the set of the data models that have been over fitted and perform poorly on the validation data $p_3$. Further, it can be observed that the range of distribution of the best performing data models on $f_2$ in comparison with their respective spread on $f_3$ and $f_4$ denotes if the generated data models have a good generalization of the input dataset. If the spreads are nearly similar then, the data models have accurately modelled the underlying patterns in the input dataset. However, if the spread on $f_3$ and $f_4$ is much larger, it indicates that there has been no good generalization or global optima data models that have been found.

Consider an embodiment of pseudo modelling method describing the method for generating best performing data models. According to the pseudo modelling method, at step 1, complete input dataset is defined with 'm' data variables and 'n' data samples. The complete input dataset may be a dataset obtained from one or more external data sources. Further, at step 2, the 'n' data samples from the received input dataset are divided into four parts, namely, $n_1$, $n_2$, $n_3$ and $n_4$. The $n = n_1 + n_2 + n_3 + n_4$. Further, the first part of the input dataset '$n_1$', is defined as the training data, the second part of the input dataset '$n_2$' is defined as the testing data, the third and fourth parts of the input dataset is defined as validation data part 1 and validation data part 2, respectively. In an embodiment of the present disclosure, the four parts $n_1$, $n_2$, $n_3$ and $n_4$ of the input dataset are divided in equal parts.

Further, at step 3, multiple templates of the one or more modelling methods are retrieved from a pool of modelling methods. For example, 'k' different modelling methods are retrieved for the pool of modelling methods. Further, at step 4, each selected template is used to create different variants of modelling method on the input dataset based on the selection of the data samples used for training, data variables selected for training and the modelling method parameter ranges. Each data variant of the modelling method is defined as a function as:

$$Mdl_j = f(Samp_{n1}, Var_{n1}, S_k, Par_s), \quad \text{equation (1)}$$

Wherein $Samp_{n1}$ is subset of $n_1$ rows,
$Var_{n1}$ is subset of $n_1$ columns,
$S_k$ is the retrieved modelling method, and
$Par_s$ is the set of modelling method parameter ranges.

Further, the retrieval process is repeated, and D number of templates are generated using:

$$Models = \{Mdl_1, Mdl_2, \ldots Mdl_D\} \quad \text{equation (2)}$$

Further, at step 5, the performance of all the data models is assessed based on the two different fitness functions defined as:

$$F_{1j} = fit_a(Mdl_j, n_1); \text{ and} \quad \text{equation (3)}$$

$$F_{2j} = fit_b(Mdl_j, n_2) \quad \text{equation (4)}$$

wherein $fit_a$ and $fit_b$ are performance metrics selected for the current problem to find a good model i.e., the main data and prediction problem. According to an embodiment of the present disclosure, it is not necessary that $fit_a$ and $fit_b$ needs to be similar in definition and/or of same scale.

Further, at step 6, an optimization method is optionally run using either or both $F_{1j}$ and $F_{2j}$ to generate best performing data models by varying the different input parameters to each data model $Mdl_j$ defined in Step #4. The best performing data model from the optimization method has the best possible fitness that is obtained on $F_{1j}$ and $F_{2j}$.

Further, at step 7, the best performing data models obtained are ranked using multi-objective optimization on $F_{1j}$ and $F_{2j}$. Each best performing data model are given a single valued fitness as:

$$TestFit_j = \#[(F_{1j}, F_{2j}) \propto \cup \{(F_{11}, F_{21}), (F_{12}, F_{22}), \ldots, (F_{1D}, F_{2D})\}] \quad \text{equation (5)}$$

Which is defined as count of modelling solutions the selected data model j dominates in the set of all data models obtained from 1 to D.

Further, the best performing data models are ranked in descending order of $TestFit_j$ and select the top P modelling solutions for next step.

Further, at step 8, the best performing data models obtained from the above step are revaluated using the data parts $n_3$ and $n_4$ to get the validation fitness using the fitness functions defined as:

$$F_{3j} = fit_c(Mdl_j, n_3);$$

$$F_{4j} = fit_d(Mdl_j, n_4),$$

wherein $fit_c$ and $fit_d$ are performance metrics selected for the current problem. In an embodiment of the present disclosure, it is not necessary that $fit_a$, $fit_b$, $fit_c$, and $fit_d$ need to be similar definition and are of same scale.

Further, at step 9, the best performing data models obtained using multi-objective optimization are ranked based on $F_{3j}$ and $F_{4j}$. Each best performing data model is given as a single valued fitness as:

$$\text{ValFit}_j = \#[(F_{3j}, F_{4j}) \propto \cup \{(F_{31}, F_{41}), (F_{32}, F_{42}) \ldots, (F_{3D}, F_{4D})\}]$$

Which is defined as the count of modelling solutions the selected data model j dominates in the set of all data models obtained from 1 to D.

Further, the best performing data models are ranked in descending order of $\text{ValFit}_j$ and the top modelling solutions are selected as final output, which is the final best performing model.

Figure 4:
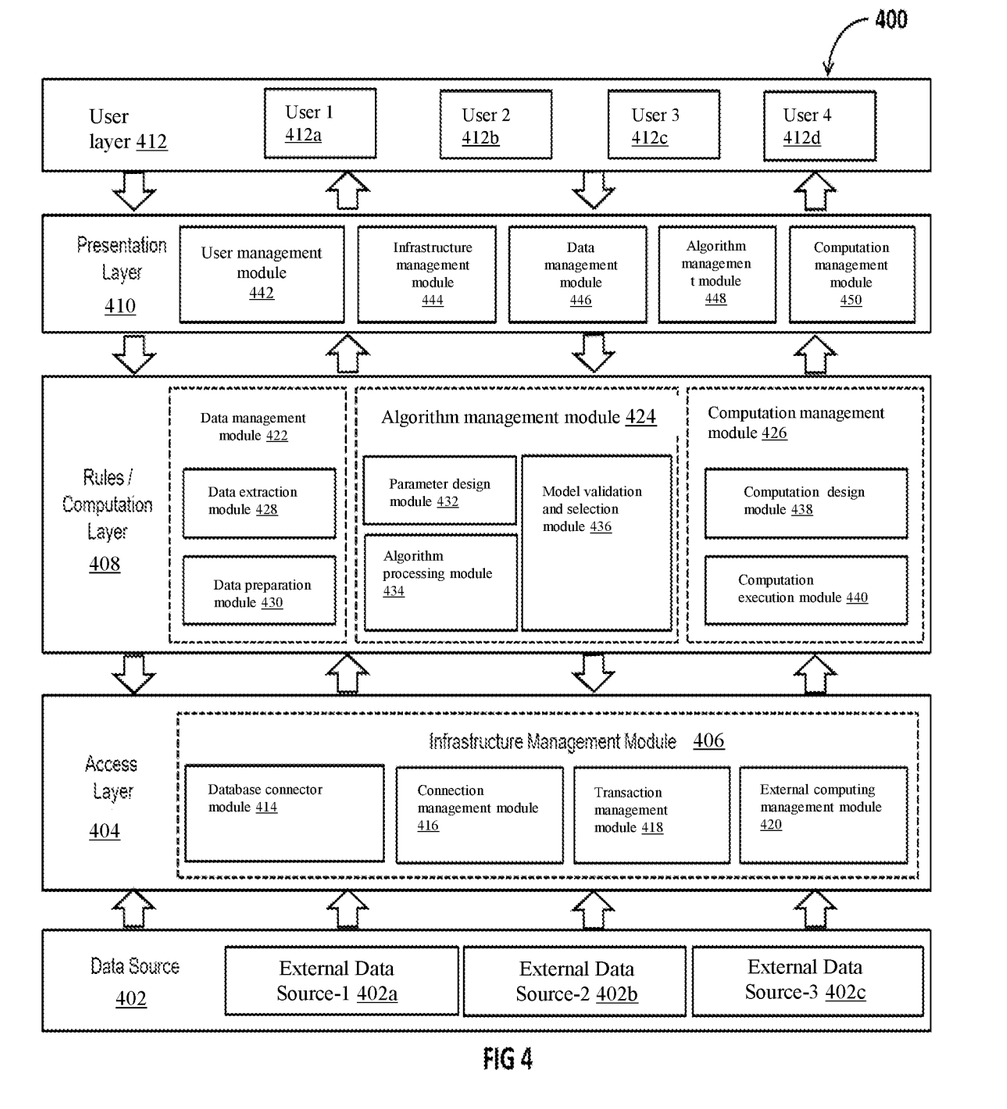
FIG. 4 is a block diagram illustrating an exemplary computing system capable of generating best performing data models for datasets in a computing environment, in accordance with an embodiment of the present disclosure.

FIG. 4 is a block diagram illustrating an exemplary computing system 400 capable of generating best performing data models for datasets in a computing environment, in accordance with an embodiment of the present disclosure. The computing system 400 comprises of a data source 402, an access layer 404, a rules or computation layer 408, a presentation layer 410 and a user layer 412. The user layer 412 comprises one or more users such as user 1 412a, user2 402b, user 3 412c and user4 412d.

Further, the access layer 404 comprises of an infrastructure management module 406. The infrastructure management module 406 comprises of a database connector module 414, a connection management module 416, a transaction management module 418, and an external computing management module 420. The rules or computation layer 408 comprises of a data management module 422, an algorithm management module 424, and a computation management module 426. The data management module 422 further comprises of a data extraction module 428 and a data preparation module 430. The algorithm management module 424 further comprises of a parameter design module 432, an algorithm processing module 434, and a model validation and selection module 436. The computation management module 426 further comprises of a computation design module 438 and a computation execution module 440. The presentation layer 410 comprises of user management module 442, infrastructure management module 444, data management module 446, an algorithm management module 448, and computation management module 450.

According to the present disclosure, the data source 402 provides a vast input dataset for modelling. In an embodiment of the present disclosure, the data source 402 comprises one or more external data sources, such as external data source—1 402a, external data source—2 402b, external data source—3 402c, and the like. The datasets obtained from the various external data sources are used together for modelling. In an embodiment of the present disclosure, the external data sources, such as the external data source—1 402a, the external data source—2 402b, the external data source—3 402c may be any of the data sources, such as, but not limited to, cloud storage, database servers, flat files and the like, and the person having ordinarily skilled in the art can understand that any of the known data sources may be used for providing datasets.

The infrastructure management module 406 of the access layer 404 allows the user to manage and monitor different types of infrastructures (to include local, distributed, cluster, and infrastructure) that may be used by the computing system 400 for its functioning. The types of infrastructures may be local, distributed, cluster or cloud infrastructure. Using the infrastructure management module 406, the computing system 400 may be connected to other external systems or modules to execute various functions depending on type and size of the dataset to be handled. In some instances, the computing system 400 connects with the other external systems to execute the one or more modelling methods and receive outputs which include model building metrics, performance dashboards, predictions, and the like.

The database connector module 414 of the infrastructure management module 406 enables the users to connect to the various external data sources, such as the external data source 1 402a, the external data source—2 402b, and the external data source—3 402c, of different types from where the dataset for data model building is obtained. The database connector module 414 receives the dataset from the one or more external data sources and merges them to form a single dataset. The database connector module 414 works in conjunction with the connection management module 416.

The connection management module 416 of the infrastructure management module 406 works in conjunction with all other modules and is the core module for managing the connection of computing system 400 with all the other external systems. In an embodiment of the present disclosure, the other external systems includes, but not limited to, external applications from where raw data is extracted, cloud-based systems that might be used to provide external computation resources to run the one or more modelling method in case of large datasets and the like.

The transaction management module 418 of the infrastructure management module 406 manages all transactions within the computing system 400 and with the other external systems. The transactions may include, but not limited to, security authentication, query management, data movement, and the like.

Further, there can be scenarios where the large datasets are involved and thus a need to use the external computing resources to execute the one or more modelling methods might arise to increase efficiency and reduce time for processing of the dataset. The external computing management module 420 manages all the external computing whether they exist on other hardware or virtually in cloud, and thereby helping in reducing time for processing of the dataset.

Further, the rules or computing layer 408 of the computing system 400 comprises the data management module 422, the algorithm management module 424, and the computation management module 426.

The computing system 400 may have various types of datasets that needs to be managed, such as for example, system data, raw data, processed data, and the like. The system data is the data intrinsic to the computing system 400 and is running like user data, job data, fitness selection, modelling method templates, and the like. The raw data is the data received by the computing system 400 from the one or more external sources and pertains to model building. The processed data is the data created from the raw data that is used as inputs for the one or more modelling methods and is also the data of the results obtained after the modelling methods are run. The data management module 422 handles management of various types of the datasets of the computing system 400.

The data extraction module 428 of the data management module 422 deals with the extraction of the dataset from the one or more external sources that is used as the raw data. The data extraction module 428 runs in conjunction with the database connector module 414. The data preparation module 430 of the data management module 422 enables processing of the raw data and enables the execution of various tasks, such as, but not limited to, error identification and correction, dataset splitting based on the needs of scientist, identification of best input dataset, synthetic data creation, and the like.

The algorithm management module 424 of the rules or computation layer 408 helps the computing system 400 with identifying and selecting the one or more suitable modelling methods for problem to be solved. Based on the problem to be solved for generating the data models, various types of the one or more modelling methods such as, but not limited to, random forest, support vector machine (SVM), J48, and the like are identified that the user might want to use. The algorithm management module 424 also helps in deciding what the input dataset is used to run the modules. The input dataset is received from the data management module 422. Further, the algorithm management module 424 helps in deciding on various parameters against which the one or more modelling method is run, for example, number of trees in a decision tree method. Further, the algorithm management module 424 also defines fitness parameters against which the model performance is measured with respect to solving the problem. The fitness parameters include mean absolute error, mean squared error, r-squared, log loss, custom cost functions, and the like.

The parameter design module 432 of the algorithm management module 424 takes care of design of all input and output parameters such as the input data, the one or more modelling method parameters and the fitness functions. Further, the algorithm processing module 434 of the algorithm management module 424 works in conjunction with the computation management module 426 and enables start and end of the running of the various one or more modelling methods and their variants. Further, the model validation and selection module 436 is the core module of the computing system 400, wherein after all the various one or more modelling methods and their variants are executed, the results obtained are used by the model validation and selection module 436 to obtain the best performing data model based on the fitness functions plotted on the pareto front.

Further, the rules or computation layer 408 comprises of the computation management module 426 that helps in managing the computation needs of the computing system 400. It is expected that at any given time, many functions of the computing system 400 may be working simultaneously, and the simultaneous functions should be provided with necessary optimum computation resources. The computation management module 426 manages the computation resources needed for managing the functions of the computing system 400.

The computation design module 438 of the computation management module 426 enables prioritisation of computation needs based on size of the computation in terms of the infrastructure and time. The computation design module 438 also enables the user to decide whether the computation should be done internally with system resources or through an externally available resource such as cloud computing. Further, the computation design module 438 also manages computing queues based on the computing needs. Once the computing queues are finalised, the computation execution module 440 manages execution of the computing queues. Through the computation execution module 440, the user handles error to ensure smooth execution of the tasks.

The presentation layer 410 of the computing system 400 handles presenting of the data and the results obtained from computation to the one or more users, such as the user 1 412a, the user 2 412b, the user 3 412c, and the user 4 412d. The presentation layer 410 comprises of the user management module 442. The user management module 442 primarily manages various kinds of the users, the user 1 412a, the user 2 412b, the user 3 412c, and the user 4 412d, that accesses the computing system 400. Different users use the computing system 400 to manage various functions right from data management to infrastructure management.

Figure 5:
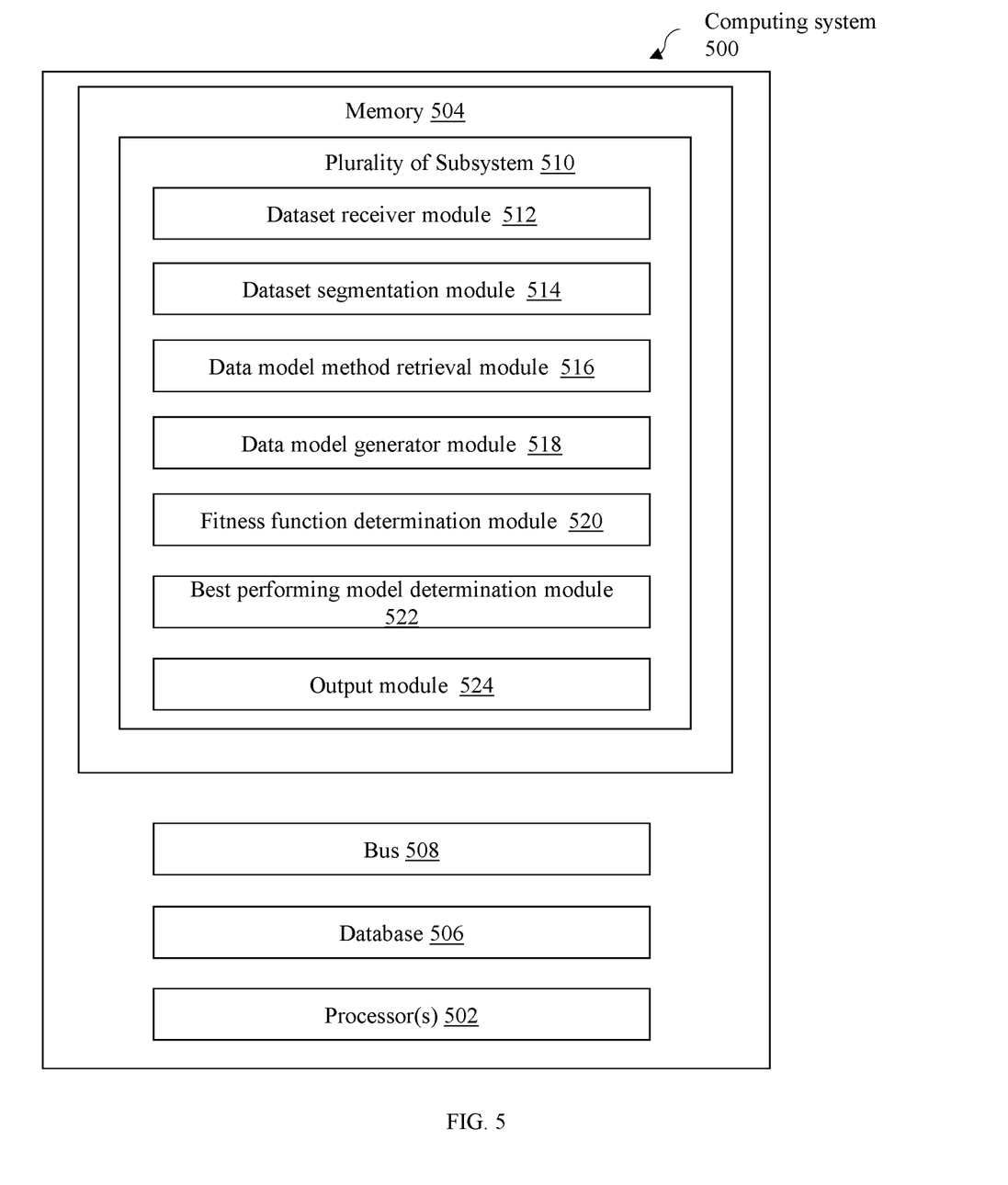
FIG. 5 is a block diagram of a computing system capable of generating best performing data models for datasets in a computing environment, in accordance with another embodiment of the present disclosure.

FIG. 5 is a block diagram of a computing system 500 capable of generating best performing data models for datasets in a computing environment, according to an embodiment herein. In FIG. 5, the computing system 500 may be similar to those shown in FIG. 4. The computing system 500 comprises a processor 502, a memory 504, and a database 506. The processor 502, the memory 504 and the database 506 are communicatively coupled through a system bus 508 or any similar mechanism. The memory 504 comprises plurality of subsystems 510 in the form of programmable instructions executable by the one or more hardware processors 502. The plurality of subsystems 510 further includes a dataset receiver module 512, a dataset segmentation module 514, a data model method retrieval module 516, a data model generator module 518, a fitness function determination module 520, a best performing data model determination module 522 and an output module 524.

The dataset receiver module 512 is configured for obtaining input dataset from one or more external data sources. The input dataset comprises data variables and data samples. The dataset segmentation module 514 is configured for dividing the obtained dataset into at least three parts based on the type of data variables and the data samples. Each part of the dataset comprises samples from the input dataset. The first part of the dataset comprises training data, the second part of the dataset comprises testing data, and the third part of the dataset comprises validation data.

The data model method retrieval module 514 is configured for retrieving one or more data modeling methods from a pool of data modeling methods stored in the database 206. The one or more data modeling methods comprises one or more parameter ranges. The one or more parameter ranges comprises prediction range, accuracy range, precision range and recall range. The one or more data modelling methods comprises one or more machine learning methods and one or more artificial intelligence methods configured for generating data models.

The data model generator module 516 is configured for generating a first set of data models for the first part of the dataset by using the retrieved one or more data modeling methods. The input to generate the first set of data models is the first part of the dataset. The data model generator module 516 is further configured for generating a second set of data models for the second part of the dataset by validating the first set of data models and the determined first fitness function with the second part of the dataset. The first set of data models represent one or more data patterns inherent in the first part of dataset and the second set of data models represents one or more data patterns inherent in the second part of dataset.

The fitness function determination module 518 is configured for determining a first fitness function for the first part of the dataset based on the generated first set of data model. The fitness function determination module 518 is configured for determining a second fitness function associated with the second part of the dataset based on the generated second set of data model.

The best performing data model determination module 520 is configured for determining at least one best performing data model among the first set of data models and the second set of data models by comparing the determined first fitness function with the determined second fitness function. In determining the at least one best performing data model among the first set of data models and the second set of data models by comparing the determined first fitness function with the determined second fitness function, the best performing data model determination module 520 is configured for determining at least one best performing data model among the first set of data models and the second set of data models by comparing the determined first fitness function with the determined second fitness function using a pareto front method.

In determining the at least one best performing data model among the first set of data models and the second set of data models by comparing the determined first fitness function with the determined second fitness function, the best performing data model determination module 520 is configured for determining performance of the first set of data models and the second set of data models based on the first fitness function and the second fitness function. Further, the best performing data model determination module 520 is configured for ranking the first set of data models and the second set of data models based on determined performance of the first set of data models and the second set of data model. The database 206 is configured to store all information related to the input dataset, the fitness functions, the one or more modelling methods, and the like.

Figure 6:
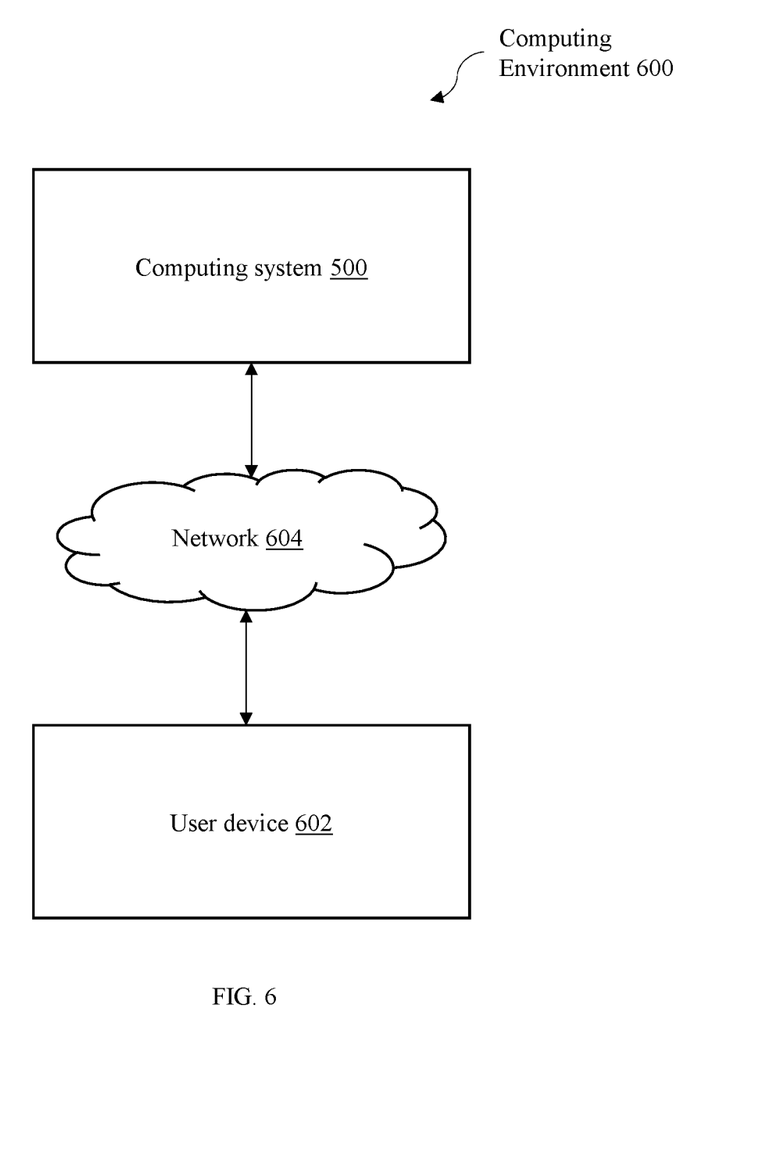
FIG. 6 is a block diagram of a computing environment capable of generating best performing data models for datasets, in accordance with an embodiment of the present disclosure.

FIG. 6 is a block diagram of a computing environment 600 capable of generating best performing data models for datasets, according to an embodiment herein. The computing environment 600 comprises a computing system 500 (such as those shown in FIG. 5 and such as those in FIG. 4). The computing system 500 is communicatively coupled to a user device 602 via a network 604. In one specific embodiment, the network 604 may include, but not limited to, an internet connection, a wireless fidelity (WI-FI) and the like. Although, FIG. 6 illustrates the computing system 500 connected to one user device 602, one skilled in the art can envision that the computing system 500 can be connected to several user devices located at different locations via the network 604. The user device 602 can be a laptop computer, aa desktop computer, a tablet computer, a smartphone and the like. The user device 602 can access software applications via a web browser. The computing system 500 may be capable of generating best performing data models in the computing environment 600. The computing system 500 performs the functions as described above in FIG. 5 and FIG. 4.

Those of ordinary skilled in the art will appreciate that the hardware depicted in FIG. 6 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a computing system 500 as is unique to the present disclosure or necessary for an understanding of the present disclosure is depicted and described. The remainder of the construction and operation of the computing system 500 may conform to any of the various current implementation and practices known in the art.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for performing context-based application disablement on an electronic device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method for generating best performing data models for datasets in a computing environment, wherein the method comprises:
    obtaining, by a processor, an input dataset from one or more external data sources, wherein the input dataset comprises data variables and data samples;
    dividing, by the processor, the obtained dataset into at least three parts based on a type of data variables, the data samples, and user requirements, wherein each part of the dataset comprises samples from the input dataset, and wherein a first part of the dataset comprises training data, a second part of the dataset comprises testing data, and a third part of the dataset comprises validation data;
    retrieving, by the processor, one or more data modeling methods from a pool of data modeling methods stored in a database, wherein the one or more data modeling methods comprises one or more parameter ranges;
    generating, by the processor, a first set of data models for the first part of the dataset by using the retrieved one or more data modeling methods, wherein an input to generate the first set of data models is the first part of the dataset;
    determining, by the processor, a first fitness function for the first part of the dataset based on the generated first set of data models;
    generating, by the processor, a second set of data models for the second part of the dataset by validating the first set of data models and the determined first fitness function with the second part of the dataset;
    determining, by the processor, a second fitness function associated with the second part of the dataset based on the generated second set of data models;
    determining, by the processor, at least one best performing data model among the first set of data models and the second set of data models by comparing the determined first fitness function with the determined second fitness function;
    validating the determined at least one best performing data model using the third part of the dataset to generate a final best performing data model; and
    outputting the final best performing data model that explains inherent pattern in the input dataset on a user interface of a user device.

2. The method of claim 1, wherein the one or more parameter ranges includes at least one of a set comprising prediction range, accuracy range, precision range, and recall range.

3. The method of claim 1, wherein the one or more data modelling methods comprises one or more machine learning methods and one or more artificial intelligence methods configured for generating data models.

4. The method of claim 1, wherein the first set of data models represent one or more data patterns inherent in the first part of the dataset and the second set of data models represents one or more data patterns inherent in the second part of datasets.

5. The method of claim 1, wherein determining the at least one best performing data model among the first set of data models and the second set of data models by comparing the determined first fitness function with the determined second fitness function comprises:
    determining the at least one best performing data model among the first set of data models and the second set of data models by comparing the determined first fitness function with the determined second fitness function using a pareto front method.

6. The method of claim 1, wherein determining the at least one best performing data model among the first set of data models and the second set of data models by comparing the determined first fitness function with the determined second fitness function comprises:
    determining performance of the first set of data models and the second set of data models based on the first fitness function and the second fitness function; and
    ranking the first set of data models and the second set of data models based on the determined performance of the first set of data models and the second set of data models.

7. A system for generating best performing data models for datasets in a computing environment, the system comprises:
    one or more hardware processors; and
    a memory coupled to the one or more hardware processors, wherein the memory comprises a plurality of subsystems in the form of programmable instructions executable by the one or more hardware processors, wherein the plurality of subsystems comprises:
    a dataset receiver module configured for obtaining an input dataset from one or more external data sources, wherein the input dataset comprises data variables and data samples;
    a dataset segmentation module configured for dividing the obtained dataset into at least three parts based on a type of the data variables, the data samples, and user requirements, wherein each part of the dataset comprises samples from the input the dataset, and wherein a first part of the dataset comprises training data, a second part of the dataset comprises testing data, and a third part of the dataset comprises validation data;
    a data model method retrieval module configured for retrieving one or more data modeling methods from a pool of data modeling methods stored in a database, wherein the one or more data modeling methods comprises one or more parameter ranges;

a data model generator module configured for generating a first set of data models for the first part of the dataset by using the retrieved one or more data modeling methods, wherein input to generate the first set of data models is the first part of the dataset;

a fitness function determination module configured for determining a first fitness function for the first part of the dataset based on the generated first set of data models;

the data model generator module further configured for generating a second set of data models for the second part of the dataset by validating the first set of data models and the determined first fitness function with the second part of the dataset;

the fitness function determination module configured for determining a second fitness function associated with the second part of the dataset based on the generated second set of data models;

a best performing data model determination module configured for determining at least one best performing data model among the first set of data models and the second set of data models by comparing the determined first fitness function with the determined second fitness function; wherein the best performing data model determination module is further configured for:
  validating the determined at least one best performing data model using the third part of the dataset to generate a final best performing data model; and an output module configured for outputting the determined at least one best performing data model that explains inherent pattern in the input dataset; on a user interface of a user device.

8. The system of claim 7, wherein the one or more parameter ranges includes at least one of a set comprising prediction range, accuracy range, precision range, and recall range.

9. The system of claim 7, wherein the one or more data modelling methods comprises one or more machine learning methods and one or more artificial intelligence methods configured for generating data models.

10. The system of claim 7, wherein the first set of data models represent one or more data patterns inherent in the first part of the dataset and the second set of data models represents one or more data patterns inherent in the second part of the dataset.

11. The system of claim 7, wherein in determining the at least one best performing data model among the first set of data models and the second set of data models by comparing the determined first fitness function with the determined second fitness function, the best performing data model determination module is configured for:
  determining the at least one best performing data model among the first set of data models and the second set of data models by comparing the determined first fitness function with the determined second fitness function using a pareto front method.

12. The system of claim 7, wherein in determining the at least one best performing data model among the first set of data models and the second set of data models by comparing the determined first fitness function with the determined second fitness function, the best performing data model determination module is configured for:
  determining performance of the first set of data models and the second set of data models based on the first fitness function and the second fitness function; and
  ranking the first set of data models and the second set of data models based on determined performance of the first set of data models and the second set of data models.

13. A non-transitory computer-readable storage medium having instructions stored therein that, when executed by a hardware processor, causes the processor to perform method steps comprising:
  obtaining an input dataset from one or more external data sources, wherein the input dataset comprises data variables and data samples;
  dividing the obtained dataset into at least three parts based on a type of the data variables, the data samples, and user requirements, wherein each part of the dataset comprises an samples from the input datasets, and wherein the first part of the dataset comprises training data, the second part of the dataset comprises testing data, and third part of the dataset comprises validation data;
  retrieving one or more data modelling methods from a pool of data modelling methods stored in a database, wherein the one or more data modelling methods comprises one or more parameter ranges;
  generating a first set of data models for the first part of the dataset by using the retrieved one or more data modelling methods, wherein input to generate the first set of data models is the first part of the dataset;
  determining a first fitness function for the first part of the dataset based on the generated first set of data models;
  generating the second set of data models for the second part of the dataset by validating the first set of data models and the determined first fitness function with the second part of the dataset;
  determining a second fitness function associated with the second part of the dataset based on the generated second set of data models;
  determining at least one best performing data model among the first set of data models and the second set of data models by comparing the determined first fitness function with the determined second fitness function;
  validating the determined at least one best performing data model using the third part of the dataset to generate a final best performing data model; and
  outputting the final best performing data model that explains inherent pattern in the input dataset on a user interface of a user device.

14. The non transitory computer-readable storage medium of claim 13, wherein the one or more parameter ranges includes at least one of a set comprising prediction range, accuracy range, precision range, and recall range.

15. The non transitory computer-readable storage medium of claim 13, wherein the one or more data modelling methods comprises one or more machine learning methods and one or more artificial intelligence methods configured for generating data models.

16. The non transitory computer-readable storage medium of claim 13, wherein the first set of data models represent one or more data patterns inherent in the first part of the dataset and the second set of data models represents one or more data patterns inherent in the second part of the dataset.

17. The non transitory computer-readable storage medium of claim 13, wherein in determining at least one best performing data model among the first set of data models and the second set of data models by comparing the determined first fitness function with the determined second fitness function, cause the processor to perform method step:

determining at least one best performing data model among the first set of data models and the second set of data models by comparing the determined first fitness function with the determined second fitness function using a pareto front method.

18. The non transitory computer-readable storage medium of claim 13, wherein in determining at least one best performing data model among the first set of data models and the second set of data models by comparing the determined first fitness function with the determined second fitness function, cause the processor to perform method step:

determining performance of the first set of data models and the second set of data models based on the first fitness function and the second fitness function; and ranking the first set of data models and the second set of data models based on determined performance of the first set of data models and the second set of data models.

* * * * *